United States Patent [19]

Murono

[11] Patent Number: 5,608,871
[45] Date of Patent: Mar. 4, 1997

[54] INTER-NETWORK CONNECTION APPARATUS HAVING ADDRESS SEARCHING/REGISTERING SECTIONS, NETWORK CONTROL SECTIONS WITH A RECEIVING FIFO MEMORY AND A SENDING FIFO MEMORY

[75] Inventor: Takahiro Murono, Tokyo, Japan

[73] Assignee: Kabushiki Kaisha Toshiba, Kawasaki, Japan

[21] Appl. No.: 343,872

[22] Filed: Nov. 17, 1994

[30] Foreign Application Priority Data

Nov. 17, 1993 [JP] Japan .................................. 5-288102

[51] Int. Cl.$^6$ ............................................. G06F 13/00
[52] U.S. Cl. ........................ 395/200.02; 395/200.06; 395/200.13; 395/200.15; 395/250; 370/402; 340/146.2; 340/825; 340/825.07
[58] Field of Search ...................... 395/200.02, 200.06, 395/200.13, 200.15, 250; 340/146.2, 825, 825.07; 370/60, 85.13, 92

[56] References Cited

U.S. PATENT DOCUMENTS

| | | | |
|---|---|---|---|
| 4,887,075 | 12/1989 | Hirasawa | 340/825.03 |
| 4,933,937 | 6/1990 | Konishi | 370/85.13 |
| 5,136,580 | 8/1992 | Videlock et al. | 370/60 |
| 5,210,748 | 5/1993 | Onishi et al. | 370/85.13 |
| 5,329,527 | 7/1994 | Ujihashi et al. | 370/85.13 |

*Primary Examiner*—Thomas C. Lee
*Assistant Examiner*—Po C. Huang
*Attorney, Agent, or Firm*—Oblon, Spivak, McClelland, Maier & Neustadt, P.C.

[57] ABSTRACT

A connection apparatus connecting LANs includes LAN control sections, an address searching/registering section and a wiring network. The LAN control sections are respectively provided for LANs which transmit frames, and at least issue a request for address registering and a request for address searching. The address searching/registering section executes address searching/registering processing in accordance with the address searching/registering requests from the LAN control sections. The wiring network includes transmission lines for independently transmitting frames between the LAN control sections.

6 Claims, 4 Drawing Sheets

12: ADDRESS SEARCHING/
REGISTERING
SECTION

FIG. 7

FIG. 6

INTER-NETWORK CONNECTION APPARATUS HAVING ADDRESS SEARCHING/REGISTERING SECTIONS, NETWORK CONTROL SECTIONS WITH A RECEIVING FIFO MEMORY AND A SENDING FIFO MEMORY

BACKGROUND OF THE INVENTION

1. Field of the Invention

This invention relates to an inter-network connection apparatus for connecting networks such as LANs (Local Area Networks) to relay frames.

2. Description of the Related Art

There is an MAC (Media Access Control) bridge apparatus as one typical inter-LAN connection apparatus.

Figure 1:
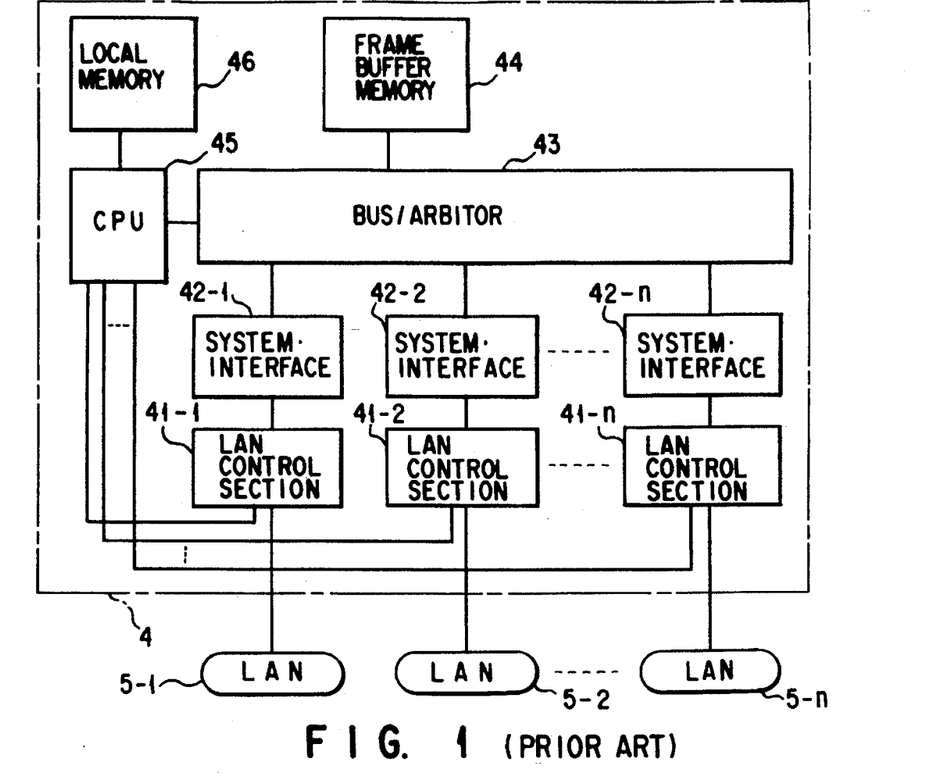
FIG. 1 is a block diagram, showing a conventional MAC bridge apparatus.

FIG. 1 shows a conventional MAC bridge apparatus. As is shown in FIG. 1, an MAC bridge apparatus comprises LAN control sections 41-1–41-n, a bus/arbiter section 43, a frame buffer memory 44, a CPU (Central Processing Unit) 45 and a local memory 46. The MAC bridge apparatus connects the LAN control sections 41-1–41-n to the bus/arbiter section 43 via system interfaces 42-1–42-n, respectively. The LAN control sections 41-1–41-n commonly use, via the bus-artiber section 43, the frame buffer memory 44 for temporarily storing received frames.

The LAN control sections 41-1–41-n correspond to the physical layer and the data link MAC sub layer of an OSI (Open System Interconnection), and transmit a frame between each of LANs 5-1–5-n and the frame buffer memory 44. At the time of the transmission of a frame, the LAN control sections receive a request for frame transmission from the CPU 45 and output a signal thereto to notify the receipt of a frame.

The system interfaces 42-1–42-n write frame data into the frame buffer memory 44 via the bus/arbiter section 43, and read frame data from the frame buffer memory 44 to transmit it. An arbiter contained in the bus/arbiter section 43 arbitrates requests from the system interfaces 42-1–42-n and the CPU 45 for accessing the frame buffer memory (common memory) 44.

On the basis of programs stored in the local memory 46, the CPU 45 concentratedly controls (1) frame-filtering (frame-discharging) processing, (2) frame-relaying processing and (3) MAC address-learning processing, which are to be performed in the bridge apparatus of FIG. 1.

As described above, the conventional bridge apparatus employs a structure, in which the frame buffer memory for temporarily storing received frames is commonly connected, via the common bus, to the LAN control sections connected to respective LANs, and in which the CPU concentratedly controls bridge processing in response to that signal from each LAN control section which notifies the receipt of a frame.

Accordingly, the capability of the conventional bridge apparatus to relay frames depends upon the data transmission speed of the bus as a transmission path of frame data, also upon the performance of the arbiter (bus arbiter) for performing arbitration regarding bus access between each LAN control section and the CPU, and upon the performance of the CPU. In other words, these are some bottlenecks to enhance the capability of relaying frames.

On the other hand, in accordance with the spread of an FDDI (Fiber Distributed Data Interface) of a transmission speed of 100 Mbps, and with the development of a large-scaled LAN system, the transmission speed of each LAN and the number of the connections of LANs have been increased.

As a result, there is a demand for greatly enhancing the frame relay capability of the bridge apparatus.

In the conventional bridge apparatus, however, the frame relay capability depends upon the data transmission speed, the performance of the arbiter and the performance of the CPU, as aforementioned. A significant increase in cost is needed to enhance the performance of such elements in order to enhance the frame-relaying capability, and a CPU of high performance, if employed, will cause a significant increase in cost.

SUMMARY OF THE INVENTION

The present invention has been developed in light of the above-described circumstances, and the object of the invention is to provide an inter-network connection apparatus of a cost-effective structure capable of controlling the relay or discharge of a frame at high speed.

According to a first aspect of the invention, there is provided an inter-network connection apparatus comprising:

network control sections provided for networks for transmitting frames, respectively, and capable of issuing at least a request for address registration and a request for address searching;

an address searching/registering section for executing address searching and address registration in response to the request for address searching and the request for address registration from the network control sections; and a non-time-divisional type physical connection mechanism provided between the network control sections for independently transmitting frames therebetween.

According to a second aspect of the invention, there is provided an inter-network connection apparatus comprising:

a plurality of network control means provided for networks, respectively;

an address searching/registering section for registering a network address in response to a request for address registering from each network control means, and for searching a network address in response to a request for address searching from each network control means and notifying the searching result to the network control means which has issued the request for address searching; and a wiring network consisting of transmission lines for independently transmitting frames between the network control means, wherein each of the network control sections includes:

means for performing first frame relay processing in which a request for searching a destination address contained in a frame supplied from a corresponding network is supplied to the address searching/registering section, and supplying via the wiring network the received frame to another network control section in accordance with the notification of a searching result from the address searching/registering section;

means for performing second frame relay processing in which the received frame is transmitted to the other network control sections via the wiring network;

means for discharging the received frame; and means for issuing to the address searching/registering section a request for searching a sender address contained in the received frame, and issuing a request for registering the sender address in accordance with the notification of a searching result with respect to the request for registering the sender address.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 2:
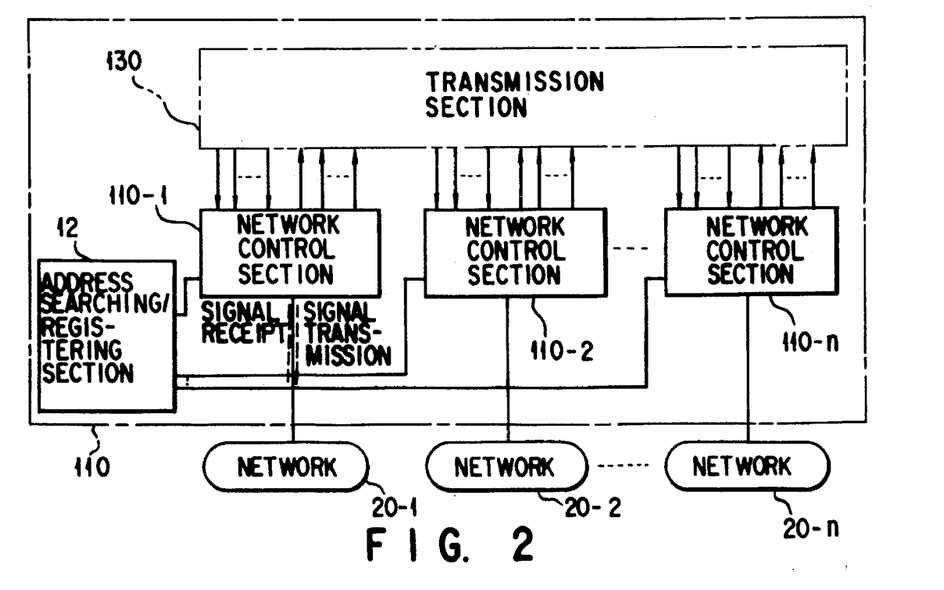
FIGS. 2–4 are block diagrams, showing embodiments of inter-network connection apparatuses of the invention.

FIG. 2 is a block diagram, showing an inter-network connection apparatus according to the invention. As is shown in FIG. 2, an inter-network connection apparatus 100 of the invention comprises network control sections 110-1, 110-2, ..., 110-n, an address searching/registering section 12, and a transmission section 130.

The network control sections 110-1–110-n are provided for networks 20-1, 20-2, ..., 20-n, respectively, and issue a request for address registration and a request for address searching. The address searching/registering section 12 is responsive to the address-registering request and the address-searching request from each network control section 110-1–110-n for executing address searching and registration.

The transmission section 130 has a plurality of dedicated transmission lines each located between the section 130 and a corresponding network control section. Frames are independently transmitted between the transmission section 130 and the network control sections 110-1–110-n through the dedicated transmission lines, respectively. The transmission section 130 has a non-time-divisional type physical connection mechanism as a wiring network 13 shown in FIGS. 3–5.

Since in the above structure, the transmission section 130 has transmission lines respectively connected to the network control sections 110-1–110-n connected to respective networks 20-1–20-n, for independently transmitting frames between the section 130 and the network control sections, the bottleneck regarding data transmission can be discharged and high-speed frame-relaying processing can be performed, as compared with the conventional inter-network connection apparatus in which a bus is commonly used between the network control sections 110-1–110-n, and arbitration is performed to determine which network control section uses the bus to transmit a frame.

Further, since in the structure of FIG. 2, each network control section controls frame-relaying processing, the processing can be performed at high speed without using an expensive CPU of high performance, as compared with the conventional inter-network connection apparatus in which only the CPU concentratedly performs such a control.

Figure 3:
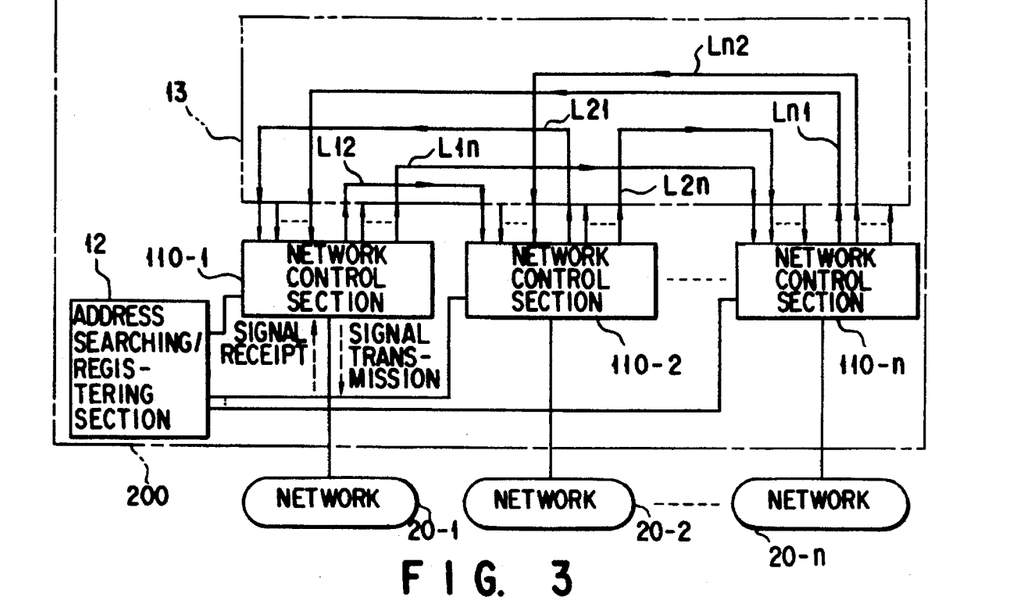
Figure 4:
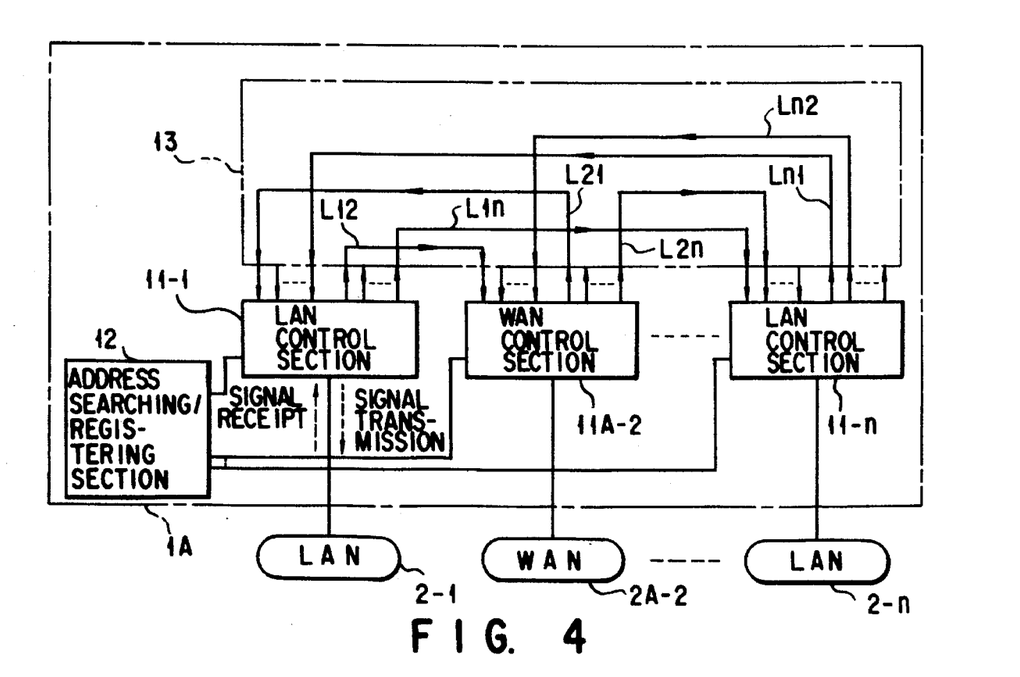
Figure 5:
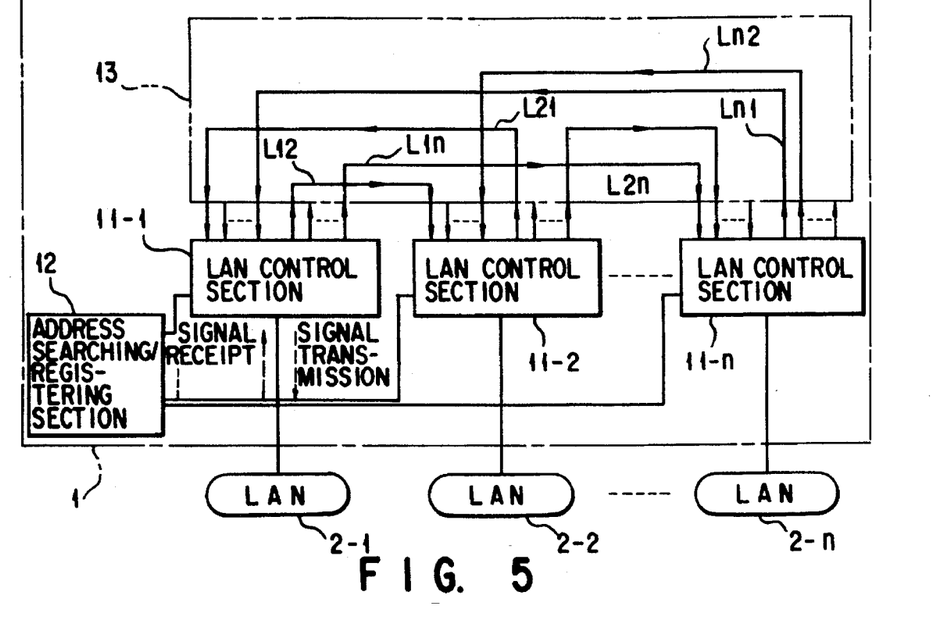
FIG. 5 is a block diagram, showing an embodiment of an MAC bridge apparatus of the invention.

FIGS. 3–5 show preferable examples of the inter-network connection apparatus of FIG. 2. An inter-network connection apparatus 200 shown in FIG. 3 has a wiring network 13 in place of the transmission section 130.

The wiring network 13 is a non-time-divisional type physical connection mechanism which employs a plurality of dedicated transmission lines each connected between a corresponding pair of the network control sections 110-1–110-n for independently transmitting frames therebetween.

An inter-network connection apparatus 1A shown in FIG. 4 is applicable to networks which comprise LANs 2-1, ..., 2-n and a WAN (Wide Area Network) 2A-2. The LANs 2-1, ..., 2-n are connected to LAN control sections 11-1, ..., 11-n, and the WAN 2A-2 is connected to a WAN control section 11A-2.

An inter-network connection apparatus shown in FIG. 5 is an MAC bridge apparatus which is a typical inter-LAN connection apparatus. As is shown in FIG. 5, an MAC bridge apparatus 1 connects LAN 2-1-2-n to each other for relaying frames therebetween, and has LAN control sections 11-1–11-n connected to the LAN 2-1-2-n, respectively, an address searching/registering section 12 and a wiring network 13.

The LAN control sections 11-i (i=1–n) have a function for transmitting frame data between a LAN 2-i connected thereto and the wiring network 13. Further, the LAN control section 11-i executes, as an element of the MAC bridge apparatus, functions for (1) selecting where a frame should be relayed, (2) filtering or discharging a frame, and (3) learning an MAC address in accordance with the notification of an address searching result from the address searching/registering section 12 and with the issue of a request for address registering to the section 12.

The address searching/registering section 12 performs MAC (LAN) address registration in response to a request for MAC address registration from the LAN control sections 11-1–11-n, and performs searching whether or not the MAC address registration has been performed in response to the request from the LAN control sections 11-1–11-n, and notifying the searching result (coincidence/non-conincidence notification). In the case of notifying that the registration has been performed (i.e., in the case of coincidence notification), it is also notified to which of the LANs 2-1-2-n the registered address is directed.

The wiring network 13 is a data path network for transmitting data therethrough between the LAN control sections 11-1–11-n, and has bidirectional parallel data lines L12, ..., L1n, L21, ..., L2n, ..., Ln1, ..., Ln2, ..., which are independently provided between the LAN control sections 11-1–11-n. The data line Lij, for example, indicates a transmission line between the LAN control sections 11-i and 11-j.

Figure 6:
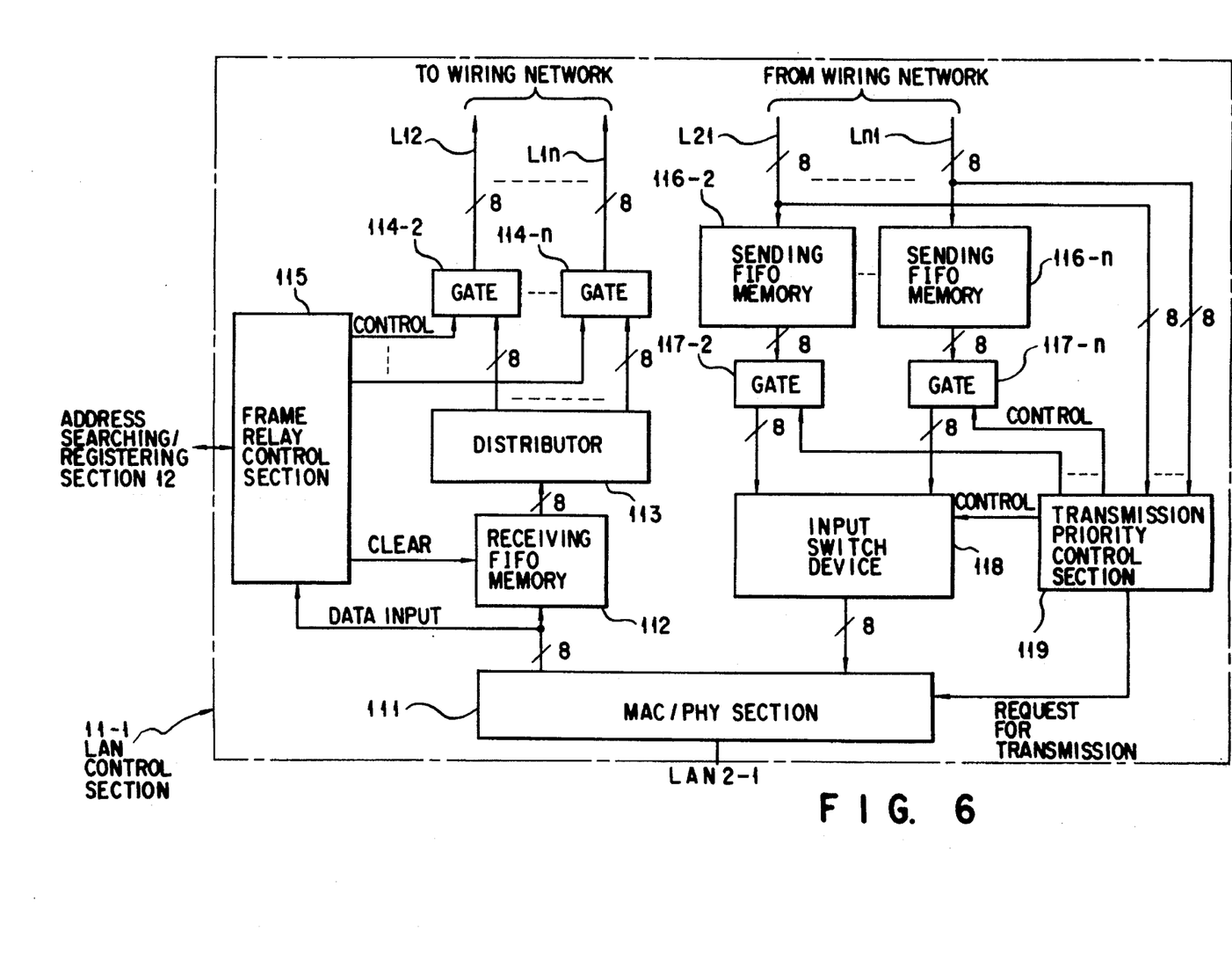
FIG. 6 is a block diagram, showing an LAN control section 11-1 employed in the embodiment of FIG. 5.

FIG. 6 illustrates in detail the structure of the LAN control section 11-1 shown in FIG. 5.

The LAN control section 11-1 has a LAN controller such as an FDDI controller (hereinafter called a "MAC/PHY section") 111, a receiving FIFO (First-In-First-Out) memory 112, a distributor 113, outputting gates 114-2–114-n, a frame relay control section 115, transmitting FIFO memories 116-2–116-n, inputting gates 117-2–117-n, an input switch 118 and a transmission priority control section 119.

The MAC/PHY section 111 corresponds to the physical layer and the data link MAC sub-layer of an OSI, receives all frames and transmits a frame in response to a request from the transmission priority control section 119.

The receiving FIFO memory 112 is provided for temporarily storing frame data received by the MAC/PHY section 111. The data stored in the FIFO memory 112 has a size larger than the length of the header portion of the received frame because of the reason hereinafter referred to.

The distributor 113 distributes data output from the receiving FIFO memory 112, to the gates 114-2–114-n.

Each gate 114-j (j=2-n) is responsive to an instruction from the frame relay control section 115 for opening/closing the data lines extending from the distributor 113 to the wiring network 13. The output terminal of the gate 114-j is connected to a corresponding dedicated data line L1j of the wiring network 13 which extends to the LAN control section 11-j (FIG. 5).

The frame relay control section 115 fetches frame data received by the MAC/PHY section 111, and supplies the address searching/registering section 12 with a command to do MAC address searching. To filter and relay the frame data on the basis of the searching result, the control section 115 supplies the gates 114-2–114-n with opening/closing instructions, and supplies the receiving FIFO memory 112 with an instruction to clear the input data thereof. If necessary, the control section 115 supplies the address searching/registering section 12 with a command to do MAC address registration.

Each transmitting FIFO memory 116-j has its input terminal connected to a corresponding LAN control section 11-j via a corresponding data line Lj1 of the wiring network 13 for temporarily storing the frame data transmitted from the LAN control section 11-j. The portions of data stored in the FIFO memory 116-j are sequentially output to a corresponding gate 117-j in the order beginning from the leading portion. The FIFO memory 116-j has a size larger than one frame length.

In response to an instruction from the transmission priority control section 119, the gate 117-j opens and closes the data line which extends from the FIFO memory 116-j to the input switch 118.

The input switch 118 is responsive to an instruction from the transmission priority control section 119 for switching the connection of one of the input data lines connected to the output terminals of the gates 117-2–117-n, such that it is connected to an output line leading to the MAC/PHY section 111.

The transmission priority control section 119 detects input signals from the data lines L21–Ln1 of the wiring network 13 which are connected to the input terminals of the transmitting FIFO memories 116-2–116-n, and determines, on the basis of the order of detection, the degree of the priority of transmission of each frame data temporarily stored in the FIFO memories 116-2–116-n, to the MAC/PHY section 111, thus making a transmission schedule of the frame data. On the basis of the schedule, the transmission priority control section 119 supplies the gates 117-2–117-n with instructions to open and close them, then controls the switching of the input switch 118 and issues a request for frame transmission to the MAC/PHY section 111.

The other LAN control sections 11-2–11-n have the same structure as the LAN control section 11-1 explained above. Each LAN control section 11-j (j=2-n) is connected to the other control sections 11-1–11-n via the wiring network 13.

Figure 7:
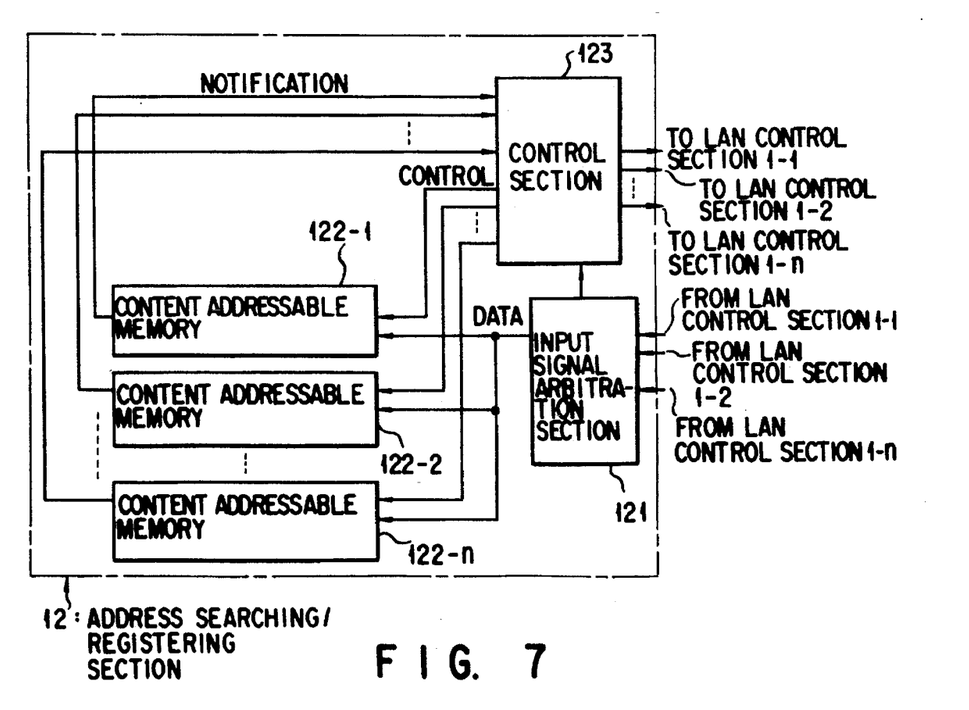
FIG. 7 is a block diagram, showing an address searching/registering section 12 employed in the embodiment of FIG. 5.

FIG. 7 illustrate in detail the structure of the address searching/registering section 12 shown in FIG. 5.

The address searching/registering section 12 has an input signal arbitration section 121, content addressable memories (CAMs) 122-1–122-n corresponding to the LAN control sections 11-1–11-n, and a control section 123.

The input signal arbitration section 121 arbitrates access requests from the LAN control sections 11-1–11-n, and outputs MAC address data input by that one of the LAN control sections 11-1–11-n which has highest priority of access, to all the content addressable memories 122-1–122-n. Further, the section 121 notifies the control section 123 from which of the LAN control sections the input command data has been supplied.

The content addressable memories 122-1–122-n each have a register for registering an MAC address in response to an MAC address data-registering request from the LAN control sections 11-1–11-n. With this structure, the content addressable memories receive MAC address data from the input signal arbitration section 121, and register the MAC address data or compare it with registered MAC address data (i.e., perform MAC address searching) in response to an instruction from the control section 123. If a registered address data corresponding to the input address data has been found, the content addressable memories 122-1–122-n notify the control section 123 of this.

The control section 123 interprets the command data input from the input signal arbitration section 121, determines from where the data has been supplied, and supplies the content addressable memories 122-1–122-n with an instruction for searching and registering the MAC address. Further, the control section 123 returns the searching result (a signal notifying that there is a registered address data identical to the input address data; this signal is hereinafter called a "coincidence notification" signal) to that one of the LAN control sections 11-1–11-n from which the request was made, together with the input address data.

The operations of the MAC bridge apparatus 1 of FIG. 5 which are performed when the LAN control section 11-1 has received a frame from the LAN 2-1, and when the LAN control section 11-1 transmits frame data output from another LAN control section, to the LAN 2-1 will now be explained in detail with reference to FIGS. 6 and 7.

(a) The operation performed at the time of receiving a frame:

Suppose that the MAC/PHY section 111 contained in the LAN control section 11-1 has received a frame from the LAN 2-1. The portions of the frame data extracted by the LAN control section 11-1 are sequentially written to the receiving FIFO memory 112 from its leading portion in units of, e.g., 8 bits.

While the frame data is written to the memory 112, it is also input to the frame relay control section 115. A leading portion of the frame data is a header portion containing a destination address DA and a sender address SA (the addresses DA and SA are arranged in this order).

When the frame relay control section 115 has received the frame data from the MAC/PHY section 111, it first checks the destination address DA contained in the frame data.

If the address DA is an individual address, the frame relay control section 115 in the LAN control section 11-1 determines whether or not the address DA is registered in the address searching/registering section 12. To this end, the control section 115 supplies the input signal arbitration section 121 of the address searching/registering section 12 with a command to do MAC address searching, together with the address data of the address DA and an identification mark for the LAN control section 11-1. Then, the control section 115 waits the notification of the searching result ("coincidence notification" or "non-coincidence notification").

When the input signal arbitration section 121 in the address searching/registering section 12 has received, from (the frame relay control section 115 of) the LAN control section 11-1, a command to do MAC address searching, together with commands to do MAC address searching or registration from other LAN control sections, it arbitrates the commands to impart priority to one of them. The manner of the arbitration is well known and similar to that performed in the bus, and hence no explanation will be given thereof.

Here, suppose that the priority has been given to the command from the LAN control section 11-1. Then, the input signal arbitration section 121 supplies the control section 123 with a commend to do MAC address searching from the LAN control section 11-1 and the identification mark attached to the command for identifying the sender of the command (i.e., the LAN control section 11-1), and also supplies the content addressable memories 122-1–122-n with the address data attached to the command (here, the contents of the address DA).

The control section 123 interprets the command (here, the MAC address searching command) supplied from the input signal arbitration section 121, and supplies all the content addressable memories 122-1–122-n with a command to do MAC address searching.

When the content addressable memories 122-1–122-n have received the MAC address searching command from the control section 123, each of the memories compares the MAC address data (here, the contents of the destination address DA contained in the frame data received by the MAC/PHY section 111 in the LAN control section 11-1) supplied from the input signal arbitration section 121, with MAC address data registered in a corresponding register (by means of a comparator provided for each register). If the comparison result indicates that both the address data are identical to each other, each memory supplies the control section 123 with "coincidence notification". On the other hand, if the comparison result indicates that the addresses are not identical to each other, each memory supplies the control section 123 with "non-coincidence notification".

When the control section 123 has received "coincidence notification" from any of the content addressable memories 122-1–122-n, it supplies (the frame relay control section 115 of) the LAN control section indicated by an identification mark supplied from the input signal arbitration section 121 (i.e., the LAN control section 11-1), with the identification mark and the searching result indicating an identified state. Further, when the control section 123 has received "non-coincidence notification" from all the content addressable memories, it supplies (the frame relay control section 115 of) the LAN control section 11-1 with the searching result ("non-coincidence notification").

When the frame relay control section 115 of the LAN control section 11-1 has received coincidence and non-coincidence notification from (the control section 123 of) the address searching/registering section 12, the section 115 performs the following control operations:

If the "non-coincidence notification" has been supplied, the frame relay control section 115 of the LAN control section 11-1 determines that the destination address DA contained in the received frame data is not registered in any of the content addressable memories 122-1–122-n, and opens the gates 114-2–114-n to supply the frame data to all the other LAN control sections 11-2–11-n.

As described above, the frame data received by the MAC/PHY section 111 is written in the receiving FIFO memory 112 in units of 8 bits. When the FIFO memory 112 has been filled with data, it starts to output the input data in units of 8 bits in the order beginning from its leading portion.

The frame data output from the receiving FIFO memory 112 in units of 8 bits is distributed to all the gates 114-2–114-n by means of the distributor 113. At this time, if the gates 114-2–114-n are opened by the frame relay control section 115 as described above, the frame data is transmitted to all the other LAN control sections 11-2–11-n via the data lines L12–L1n in the wiring network 13, and then to the LANs 2-2–2-n.

In this embodiment, the size of the memory 112 is set larger than the length of the header portion of the received frame data so that at least during a time period from when the leading portion of the frame data has been received to when the gates 114-2–114-n have been opened or closed in response to "coincidence notification" or "non-coincidence notification" from (the control section 123 of) the address searching/registering section 12, the portion of the frame data which has been stored in the memory 112 during the time period cannot be lost therefrom.

On the other hand, if the "coincidence notification" has been supplied from (the control section 123 of) the address searching/registering section 12, the frame relay control section 115 of the LAN control section 11-1 determines whether or not the destination address DA is the MAC address of the LAN 2-1 connected to the LAN control section 11-1, on the basis of the identification mark (which indicates a LAN control section corresponding to the content addressable memory which has detected the "coincidence") output from the section 12 together with the "coincidence notification".

If it is determined that the destination address DA is the MAC address of the LAN 2-1, the frame relay control section 115 closes all the gates 114-2–114-n and clears the contents of the receiving FIFO memory 112, thus discharging the frame data.

If, on the other hand, it is determined that the destination address DA is the MAC address of any one of LANs 2-j (j=2, ..., or n) other than the LAN 2-1, the frame relay control section 115 opens only the gate 114-j and keeps the other gates closed so as to supply the received frame data to the LAN control section 11-j connected to the LAN 2-j. Thus, the frame data from the FIFO memory 112 is transmitted to the LAN control section 11-j via the data line L1j, and then to the LAN 2-j.

As described above, a frame is relayed only to its destination LAN, and hence unnecessary traffic is avoided.

The above explanation has been given of the case where the designation address DA contained in received frame data is an individual address.

A case where the destination address DA contained in received frame data is a multicast address (including a broadcast) will now be explained.

In this case, the frame relay control section 115 does not issue a request for address searching to the address searching/registering section 12, and forcibly opens all the gates 114-2–114-n. As a result, frame data output from the receiving FIFO memory 112 and distributed by the distributor 113 to the gates 114-2–114-n are transmitted to all the other LAN control sections 11-2–11-n via the data lines L12–L1n of the wiring network 13, and then to the LANs 2-2–2-n.

After checking the destination address DA in the received frame data, the frame relay control section 115 checks the sender address SA successive to the destination address DA, determining whether or not the address SA is registered in the address searching/registering section 12. To this end, the frame relay control section 115 supplies (the input signal arbitration section 121 of) the address searching/registering section 12 with a command to do MAC address searching, the contents of the address SA and the identification mark of the LAN control section 11-1, and waits the notification of the searching result ("coincidence notification" or "non-coincidence notification").

Upon receiving the MAC address searching command regarding the sender address SA from the frame relay control section 115 of the LAN control section 11-1, the address searching/registering section 12 operates in the same manner as when it has received an MAC address searching command regarding the destination address DA.

When having received no "coincidence notification" from (the control section 123 of) the address searching/registering section 12 with respect to the MAC address searching command regarding the sender address SA, the frame relay control section 115 determines that the contents of the address SA is not registered in the address searching/ registering section 12. In this case, the section 115 supplies the address searching/registering section 12 with a command to do MAC address registration, the contents of the address SA and the identification mark of the LAN control section 11-1.

If the input signal arbitration section 121 of the address searching/registering section 12 determines that priority can be imparted to the MAC address registration request from (the frame relay control section 115 of) the LAN control section 11-1, it supplies the control section 123 with the MAC address registration command and the identification mark of the requester (i.e., the LAN control section 11-1), and at the same time supplies the content addressable memories 122-1–122-n with the address data (the contents of the sender address SA) attached to the command. The above operations are similar to those performed when MAC address searching has been requested.

The control section 123 interprets the command (MAC address registration command) supplied from the input signal arbitration section 121, and supplies an instruction to perform MAC address registration (writing) only to a content addressable memory (memory 122-1) corresponding to the identification mark of the requester (i.e., the LAN control section 11-1).

Upon receiving the MAC address registration instruction from the control section 123, the memory 122-1 registers in its register the MAC address data (i.e., the contents of the sender address SA contained in the frame data received by the MAC/PHY section 111 of the LAN control section 11-1).

Thus, the contents of the sender address SA has been learned.

(b) The operation performed at the time of transmitting a frame:

An explanation will be given of a case where the LAN control section 11-1 transmits frame data output from another LAN control section, to the LAN 2-1.

Suppose that frame data has been output from the LAN control section 11-2 to the LAN control section 11-1 via the data line L21 in the wiring network 13. In the LAN control section 11-1, the frame data is written to that sending FIFO memory 116-2 included in the sending FIFO memories 116-2–116-n of the section 11-1 which corresponds to the LAN control section 11-2. The input of the frame data to the sending FIFO memory 116-2 is detected by the transmission priority control section 119.

Upon detection of the data input to the sending FIFO memory 116-2, the transmission priority control section 119 determines the degrees of priority of transmission of frame data written in any of the sending FIFO memories 116-2–116-n on the basis of all the detection states of data input in the sending FIFO memories. On the basis of the determined degrees of priority, the transmission priority control section 119 controls the MAC/PHY section 111 to sequentially transmit to the LAN 2-1 frame data written in the FIFO memories 116-2–116-n.

For example, in the case of transmitting the frame data written in the FIFO memory 116-2, the transmission priority control section 119 controls the input switch 118 to close a data line between a gate 117-2 and the MAC/PHY section 111, opens the gate 117-2 and outputs a request for transmission to the MAC/PHY section 111. Upon receiving the request, the MAC/PHY section 111 sequentially reads the frame data from the FIFO memory 116-2, and transmits it to the LAN 2-1.

When a frame has been transmitted, the transmission priority control section 119 starts the transmission of another frame in the same manner as above.

Since the above embodiment employs the wiring network 13 having transfer lines each dedicated to independently transmitting a frame between a corresponding one of the LAN control sections 11-1–11-n respectively connected to the LANs 2-1–2-n, the bottleneck in data transmission can be eliminated, which is found in the conventional inter-network connection apparatus wherein data transmission is performed with the use of a single bus commonly connected between the LAN control sections 11-1–11-n. As a result, the invention can perform high-speed frame relay processing.

Moreover, since in the embodiment, each of the LAN control sections 11-1–11-n controls the relay and discharge of frame, the invention can perform such control at high speed without using an expensive CPU, as compared with the conventional inter-network connection apparatus wherein the relay/discharge control of all frames is controlled only by a CPU employed therein. In addition, in the embodiment, each LAN control section employs a receiving FIFO memory; and sending FIFO memories corresponding to the other LAN control sections, for temporarily registering frames supplied from the other LAN control sections via a wiring network and transmitting them to corresponding LANs. By virtue of this structure, buffering of received or transmitting frames can be performed at high speed in a reliable manner, as compared with the conventional inter-network connection apparatus which employs only a single frame buffer memory commonly used.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An inter-network connection apparatus comprising:

network control sections provided for networks for transmitting frames, respectively, and capable of issuing at least a request for address registration and a request for address searching;

address searching/registering sections each having means for registering a network address in accordance with the request for address registration from a corresponding one of the network control sections, searching a network address in accordance with the request for address searching from said corresponding one of the network control sections, and notifying said corresponding one of the network control sections, which has issued the request for address searching, of a searching result; and a wiring network which comprises transmission lines, and which is provided between the network control sections for independently transmitting frame therebetween, wherein each of the network control sections includes:

a receiving FIFO memory for temporarily registering a frame supplied from a corresponding one of the networks;

a sending FIFO memory for temporarily registering a frame transmitted from said each of the network control sections;

means for relaying and discharging the frame registered in the receiving FIFO memory and transmitting the frame registered in the sending FIFO memory, to said corresponding one of the networks;

means for performing first frame relay processing in which a request for searching a destination address contained in a frame supplied from said corresponding one of the networks is supplied to the address searching/registering section, and supplying via the wiring network the received frame registered in the receiving FIFO memory to another network control section in accordance with the notification of a searching result from the address searching/registering section;

means for performing second frame relay processing in which the received frame is transmitted to the other network control sections via the wiring network;

means for issuing to the address searching/registering section a request for searching a sender address contained in the received frame, and issuing a request for registering the sender address in accordance with the notification of a searching result with respect to the request for registering the sender address.

2. The inter-network connection apparatus according to claim 1, wherein the transmission lines are made of electric wires.

3. The inter-network connection apparatus according to claim 1, wherein each network control section includes:

a gate for transmitting the frame supplied from the receiving FIFO memory, to another network control section via the non-time-divisional type physical connection mechanism;

a frame relay control section for controlling the opening/closing of the gate and maintaining/clearing the value of the receiving FIFO memory in accordance with the notification of the searching result from the address searching/registering section; and a switch section for outputting, as a transmission frame, the frame temporarily stored in the receiving FIFO memory.

4. The inter-network connection apparatus according to claim 1, wherein the networks are LANs.

5. The inter-network connection apparatus according to claim 1, wherein the networks are WANs.

6. The inter-network connection apparatus according to claim 1, wherein the networks are LANs and WANs.

* * * * *